United States Patent [19]

Guest

[11] Patent Number: 4,584,000

[45] Date of Patent: Apr. 22, 1986

[54] LIQUID SPRAYING

[75] Inventor: Graham J. Guest, Wolverhampton, England

[73] Assignee: Dresser Industries, Inc., Dallas, Tex.

[21] Appl. No.: 669,498

[22] Filed: Nov. 8, 1984

[30] Foreign Application Priority Data

Nov. 17, 1983 [GB] United Kingdom ............... 8330663

[51] Int. Cl.⁴ .............................................. B05B 3/10
[52] U.S. Cl. ........................................ 55/73; 261/88; 159/4 S; 239/223; 239/222.11; 239/467; 55/242; 159/4.2
[58] Field of Search ............... 261/88; 159/4 S; 239/223, 224, 222.11, 467; 55/73, 242

[56] References Cited

U.S. PATENT DOCUMENTS

| | | | |
|---|---|---|---|
| 1,601,897 | 10/1926 | Wiley et al. .................... | 159/4 S |
| 1,869,384 | 8/1932 | MacLachlan .................. | 159/4 S |
| 2,220,275 | 11/1940 | Preston .......................... | 159/4 S |
| 2,495,328 | 1/1950 | Harrison ......................... | 239/223 |
| 2,502,445 | 4/1950 | Fash .............................. | 159/4 S |
| 2,539,061 | 1/1957 | Coles .............................. | 239/467 |
| 2,869,175 | 1/1959 | Ebbinghouse ................... | 159/4 S |

FOREIGN PATENT DOCUMENTS

| | | | |
|---|---|---|---|
| 846076 | 7/1970 | Canada ............................. | 159/4 S |
| 153563 | 2/1956 | Sweden ............................ | 159/4 S |
| 428018 | 5/1935 | United Kingdom ............... | 239/223 |
| 430794 | 6/1935 | United Kingdom ............... | 239/223 |
| 463727 | 4/1937 | United Kingdom . | |
| 504392 | 4/1939 | United Kingdom . | |
| 964367 | 7/1964 | United Kingdom ............... | 159/4 S |
| 1064695 | 4/1967 | United Kingdom . | |
| 2084896 | 4/1982 | United Kingdom . | |
| 2115309 | 9/1983 | United Kingdom . | |
| 2131328 | 6/1984 | United Kingdom . | |
| 2149685 | 6/1985 | United Kingdom . | |

OTHER PUBLICATIONS

Swirl nozzle leaflet entitled, "Type By, CA & CM Cone Spray Solid"—Delavan Ltd., U.K.
Chemical Engineering Science, 1963, vol. 18, pp. 315-321 and 323-337.
Chemical Engineering Science, 1963, vol. 18, pp. 339-353.

Primary Examiner—Tim Miles
Attorney, Agent, or Firm—Daniel Rubin; Richard M. Byron

[57] ABSTRACT

A method of treating a polluted gas e.g. desulphurizing a sulphur dioxide-containing flue gas is carried out by spraying the flue gas with a slurry of e.g. calcium hydroxide, under spray drying conditions. The spray device comprises a rotating cup comprising an extended surface on which a film of slurry is formed. On leaving the surface the slurry is immediately impacted with a high velocity stream of air supplied through an annular orifice.

Arrangements for supplying the slurry to the rotating cup comprises a stationary distribution device adapted to direct the slurry onto the surface with a swirl component of motion.

30 Claims, 6 Drawing Figures

LIQUID SPRAYING

This invention is concerned with improvements in or relating to liquid spraying particularly but not exclusively the spraying of a liquid/solid slurry.

In for example U.K. Patent Application No. 2,084,896A (Patent No. 2,084,896B) of Lodge-Cottrell Limited (the entire disclosure of which is incorporated herein by reference) there is described a spray device for liquids comprising a high speed rotating cup the interior of which provides an extended surface from which the liquid is directed; when the liquid has left the surface it is impacted with a gas stream thereby to produce a spray of liquid droplets.

One of the technical applications described in Patent Application No. 2,084,896 for this spray device is the treatment of a polluted gas e.g. containing sulphur dioxide, by the spraying into the gas of a liquid/solid slurry e.g. an aqueous lime slurry.

One problem which sometimes arises with the spraying of a slurry using a rotating cup spray device is the uncontrolled build-up of solids on the spray device, which for example may upset its dynamic balance and can result in serious mechanical failure; build-up of solids can also result in blockage of liquid supply ducts.

It is believed that the build-up of solids can result for example from the back-circulation of the sulphur dioxide containing gas, which then reacts with the lime slurry to form a solid reaction product.

Also described in Patent Application No. 2,084,896 is the use of a sodium carbonate solution in replacement of the aqueous lime slurry; other technical applications described therein are conditioning of a gas with water prior to passage through an electro-precipitator, and the evaporative cooling with water of a hot polluted gas; in all these cases build-up of solids can arise, e.g. if the liquid being sprayed contains solid particulate impurities; or the risk of build-up of solids may arise from the nature of the polluted gas e.g. in the case of the evaporative cooling of polluted gas from a cement plant.

It is an object of the present invention to provide an improved spray device in which uncontrolled build-up of solids is inhibited.

In the spray device of Patent Application No. 2,084,896 the liquid is supplied to the interior of the cup by distribution means which rotates with the cup where the liquid is directed by the distribution means onto the extended surface; and it has now been found that advantageously the distribution means is maintained stationary.

The invention provides a method of treating a polluted gas with a liquid, wherein the liquid is directed from an extended surface of a spray device into the polluted gas to cool and/or clean the gas, the spray device comprising (a) an axially symmetrical cup having an outer rim and an interior surface which provides said extended surface; (b) distribution means, arranged symmetrically with respect to the cup, for directing liquid onto the extended surface and for providing a film of liquid on the extended surface preparatory to directing the liquid from the surface past the outer rim, which distribution means is stationary where it directs the liquid onto the extended surface and provides a swirl component of motion in the liquid being directed onto the extended surface; and (c) means for supplying a gas to impact the liquid immediately beyond the rim, to produce a spray of liquid droplets.

The gas may, for example, contain a solid pollutant e.g. fly ash or cement dust and/or a gaseous pollutant e.g. sulphur dioxide, nitrogen oxides, hydrogen chloride and mixtures thereof.

In embodiments of the invention described hereinafter the cup is rotated, but we believe under certain conditions it may also be possible to operate satisfactorily with the cup stationary.

The invention also provides apparatus adapted for use in absorbing a gaseous pollutant from a pollutant-containing gas under spray drying conditions comprising (a) a spray dryer vessel; (b) means for conducting a pollutant-containing gas to the vessel; (c) a spray device adapted to spray an aqueous absorbent liquid into the vessel for reaction with the pollutant in the gas under the spray drying conditions to produce a solid reaction product; (d) means for separating solid reaction product from the gas; and (e) means for conducting the gas from the spray dryer vessel to the separating means; the spray device comprising: (f) an axially symmetrical cup having an outer rim and an interior surface which provides an extended surface; (g) distribution means, arranged symmetrically with respect to the cup, for directing liquid onto the extended surface and for providing a film of liquid on the extended surface preparatory to directing the liquid from the surface past the outer rim, which distribution means is stationary where it directs the liquid onto the extended surface and comprises stationary swirl means for providing a swirl component of motion in the liquid being directed onto the extended surface; and (h) means for supplying a gas to impact the liquid immediately beyond the rim, to produce a spray of liquid droplets.

The invention also provides a spray device comprising: (a) a massive axially symmetrical spray cup having an outer rim and an interior surface; (b) means for rotating the cup; (c) stationary distribution means, arranged symmetrically with respect to the cup, for directing liquid onto the interior surface of the cup and for providing a film of liquid on the interior surface preparatory to directing the liquid from the surface past the outer rim; and (d) means for supplying a gas stream to impact the liquid immediately beyond the rim to produce a spray of liquid droplets; the distribution means comprising: (e) a downstream duct portion; and (f) stationary swirl means for providing a swirl component of motion in the liquid being directed onto the extended surface; the swirl means comprising: (g) a stationary swirl member axially symmetrically located within the downstream duct portion of the distribution means, and wherein an annular passage is defined between the swirl member and the duct portion; the swirl member comprising: (h) a plurality of symmetrically arranged swirl blades; and (i) an axially symmetrical upstream conical portion the apex of the cone leading with respect to the liquid flow.

The extended surface for example converges generally frusto-conically from the outer rim of the cup, and the included frusto-conical angle is e.g. from 20° to 160°, preferably from 60° to 120°, and more preferably from 70° to 100°.

The cup in external profile comprises for example a cylindrical upstream portion and a frusto-conical downstream portion; the ratio between the axial height of the frusto-conical portion and the height of the cylindrical portion is for example from 3:1 to 1:3, preferably from 2:1 to 1:3.

The distribution means comprises for example an axially symmetrical baffle to gas flow extending into the cup coaxially therewith, an annular gap being provided between the baffle and the interior of the cup.

The ratio of the diameter (D) of the cup at its outer rim to the axial distance (d) from the outer rim to a point where the liquid enters the interior of the cup is (D:d) from 3:1 to 6:1, preferably from 3:1 to 4:1.

When the spray device has a capacity up to about 15 Imperial gallons per minute (e.g. a capacity in the range from 2 to 15 Imperial gallons per minute):

(i) the diameter of the cup at its outer rim for example does not exceed about 120 mm preferably does not exceed about 110 mm and more preferably does not exceed 80 mm.

(ii) the overall height of the cup does not exceed about 160 mm.

When the spray device has a higher capacity e.g. up to 30 or 50 Imperial gallons per minute then the numerical upper limits are likely to be increased.

The major diameter of the baffle is for example at least 70% and more preferably at least 75% of the diameter of the interior surface of the cup at the plane of said major diameter.

The baffle is for example inverted frusto-conical with its included angle not exceeding about 140°, preferably not exceeding about 120°, and more preferably from 70° to 110°.

The distribution means comprises for example an axially symmetrical upstream conical portion with the apex of the cone leading with respect to the flow of liquid. The included conical angle of this upstream conical portion is for example from 20° to 85°, preferably from 20° to 40°, more preferably from 20° to 30°.

The baffle is for example set back from the outer rim of the cup so that the ratio between the diameter (D) and the axial distance (d') from the outer rim to the baffle is (D:d') from 4:1 to 8:1, preferably from 5:1 to 8:1.

A spray device embodying the invention finds particular, but not exclusive technical application in an apparatus and method for desulphurising a sulphur-dioxide containing gas by spray drying using an aqueous lime slurry, as described in Patent Application No. 2,084,896. The spray device embodying the invention may also be employed in the other technical applications described in Patent Application No. 2,084,896; a further possible technical application is in the treatment of a polluted gas from an incinerator plant where for example a sodium carbonate solution is used to remove inter alia hydrogen chloride from the gas.

There now follows a description, to be read with reference to the accompanying drawings of embodiments of the invention. This description, which is illustrative of method and apparatus aspects of the invention, is given by way of example only, and not by way of limitation of the invention.

Figure 1:
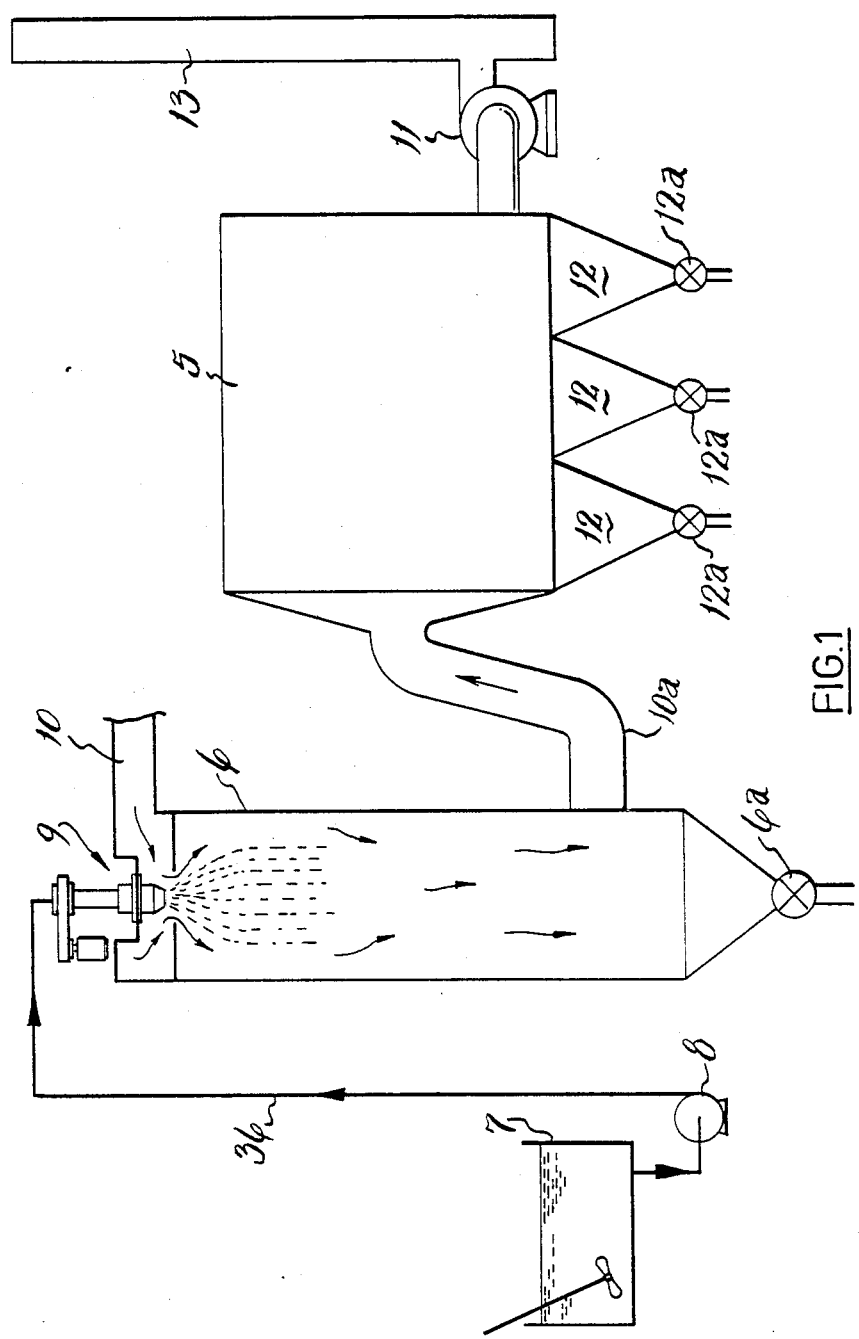
FIG. 1 shows a flow diagram of apparatus adapted for use in desulphurising flue gas.

Apparatus adapted for use in desulphursing flue gas from a coal-fired installation is illustrated schematically in FIG. 1. A unit shown at 5 for treating the flue gas after a tall thin spray dryer tower 6, comprises a bag filter on an electro-precipitator. Slurries of slaked lime or limestone are prepared in a vessel 7 and pumped by a pump 8 via a line 36 to a rotating cup atomiser 9 at the top of tower 6. Hot gas, for example boiler flue gas at a temperature between 120° C. and 200° C. containing sulphur dioxide as a pollutant (e.g. 300–3,000 p.p.m. $SO_2$ by volume) is directed to the top of the tower 6 via line 10. Spray drying occurs in the tower 6 upon contact of the hot gas and the atomised slurry, and dry powder effluent is collected at the bottom of tower 6 and removed via a valve 6a. The flue gas then passes via line 10a through bag filter or electro-precipitator 5 and further powder effluent and fly ash (including some spent absorbent) is separated from the gas, collected in hoppers 12 and removed via valves 12a. The substantially desulphurised flue gas is then exhausted by a fan 11 to the atmosphere via a stack 13.

The tower 6 and its operation are generally similar to the tower described in Patent Application No. 2,084,896 with reference to FIGS. 6, 7 and 8 thereof. Typically a single tower 6 handles up to 500,000 cubic feet (ambient conditions) per minute of flue gas (14,000 cubic meters per minute), and a 500 Megawatt coal burning power station would require 4 or 5 such towers to handle its entire flue gas effluent.

Figure 2:
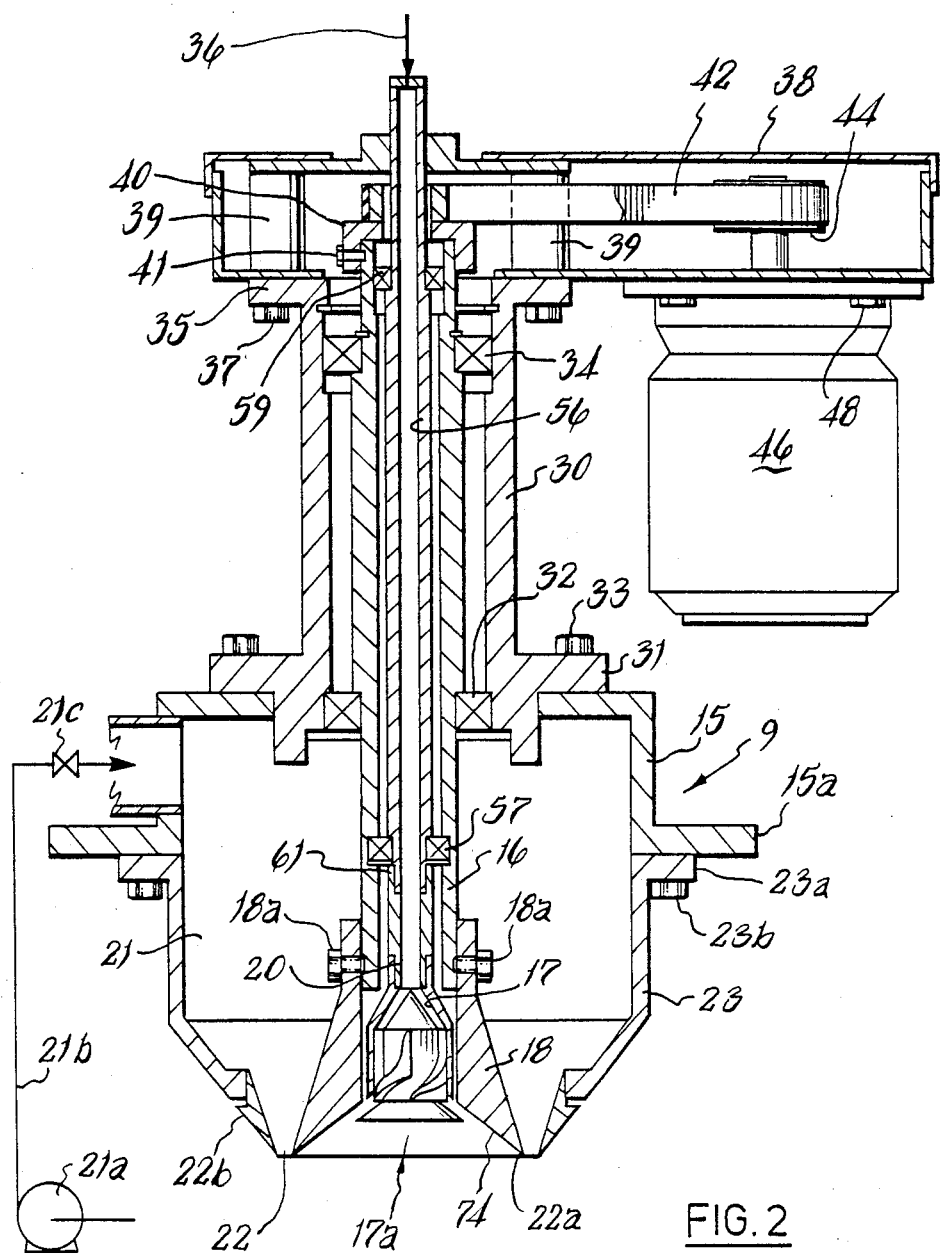
FIG. 2 shows a part-sectional view of a rotary cup atomiser.

The rotating cup atomiser 9 is shown in more detail in FIG. 2. In the atomiser 9 a liquid supply path comprises a hollow vertical stationary duct portion 56 and a vertical downstream duct portion 17 (FIG. 3) of a generally axially symmetrical stationary distributor assembly 17a which is screwed onto a lower stub end portion 20 of the duct portion 56, and leads symmetrically to the interior 18b of a massive axially symmetrical rotating cup 18 of integral form. The slurry line 36 leads into the duct portion 56.

It will be noted that the liquid supply path from the top of duct 56 downwardly is generally symmetrical about the axis of the duct portion 56, and about the axis of rotation of the cup 18.

The cup 18 of integral form is secured to a lower end portion of a rotatable hollow shaft 16, by radially spaced set screws 18a. The cup 18 rotates with the shaft 16 about its axis in the operation of the atomiser, but it wil be realized the duct portion 56 and the distributor assembly 17a remain stationary; the shaft 16 is spaced from the duct portion 56 by ball bearings 57, 59. The duct portion 56 is telescoped at 61 to accomodate the ball bearing 57.

Air is supplied to the atomiser 9 through an annular chamber 21 external to the cup 18 by, for example, a blower 21a connected to the chamber 21 via a line 21b which includes a control valve 21c. The air exits the chamber 21 at high velocity (at least 280 feet/second) via an annular nozzle aperture 22 defined around a lower, outer, rim 22a of the rotary cup 18 and between the cup 18 and a stationary cup shroud 23 which defines an outer wall of the chamber 21. The shroud 23 comprises a lower ring portion 22b the interior of which converges downwardly to define the outer boundary of the nozzle aperture 22.

The shroud 23 is bolted at 23b to a housing element 15 via respective flanges 23a, and 15a; the flange 15a is used in mounting the atomiser 9 in the tower 6. The shaft 16 extends upwardly through a housing element 30 where it is mounted in axially spaced ball bearings 32, 34. The housing element 30 is bolted at 33 to the housing element 15 via a flange 31, and extends downwardly a short distance from the flange 31 into the housing element 15.

An upper end portion of the shaft 16 extends into a belt housing 38 which is bolted at 37 to the housing element 30 via a flange 35; the housing 38 is reinforced by pillars 39. A belt pulley 40 is secured by two set screws 41 (only one of which is shown) to the upper end portion of the shaft 16 within the housing 38 and a drive belt 42 is tensioned within the housing 38 around the pulley 40 and a drive pulley 44 of an electric motor 46. The electric motor 46 is bolted to the housing 38 at 48.

In operation the cup 18 is rotated by the electric motor 46 at a speed of e.g. from 3,000 to 5,000 or 6,000 r.p.m. and the aqueous slurry of e.g. calcium hydroxide is continuously supplied to the interior 18b of the rotating cup 18 via the supply path including the distributor assembly 17a and is continuously distributed around an extended interior surface 74 of the cup 18 as a uniform thin film. As centrifugal force directs the suspension past the rim 22a of the cup it is atomised immediately beyond the rim 22a by impaction with the high velocity stream of air extending downwardly through aperture 22. This causes instability in the liquid film and results in the production of a spray of fine droplets, which is sprayed into the sulphur dioxide-containing flue gas whereby to absorb sulphur dioxide from the gas with chemical reaction. The ambient conditions of the flue gas are such that all the water is evaporated and the reaction product is dried as it is formed.

Further details of the cup 18, and the distributor assembly 17a will now be described with special reference to FIG. 3.

Figure 5:
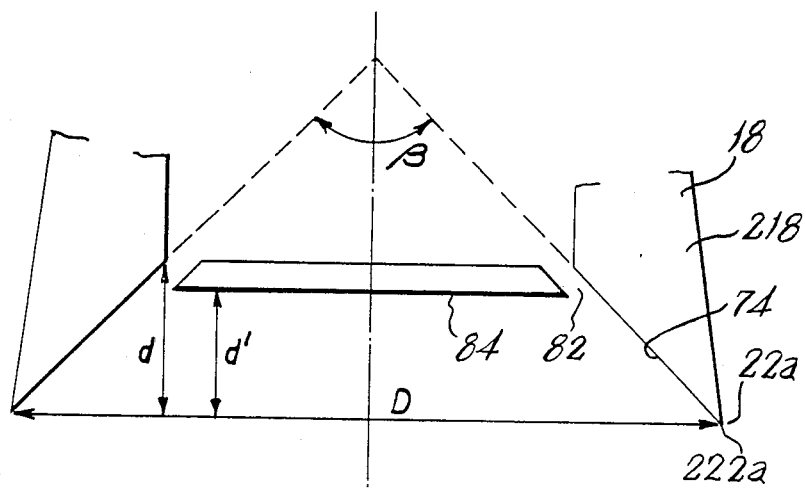
FIG. 5 illustrates conical angles.

The massive integral cup 18 comprises an upper externally circular cylindrical portion 76 which is secured to the shaft 16 by the set screws 18a and a lower externally frusto-conical portion 78 which converges upwardly from the rim 22a. The rim 22a of the cup 18 is sharply pointed and the interior surface 74 is again upwardly converging frusto-conical. The included frusto-conical angle $\beta$ (FIG. 5) of the surface 74 is about 103°; the overall height of the cup 18 from the rim 22a to the top of the cylindrical portion 76 is about 83 mm; the diameter (D) of the cup 18 at the rim 22a is about 75 mm. The ratio of the axial height of the frusto-conical portion 78 to the cylindrical portion 76 is about 2.25:1.

A lower portion 80 of the stationary distributor assembly 17a forms a frusto-conical baffle portion within the cup 18 coaxially therewith, leaving an annular gap 82 between the baffle portion 80 and the interior of the cup 18. A lower horizontal surface 84 of the baffle portion 80 is set back upwardly from the rim 22a of the cup 18. The axial distance (d) from the rim 22a to the upper extremity of the surface 74 is about 20 mm and the ratio (D:d) therefore about 3.75:1. The diameter of the surface 84 (i.e. the major diameter of the frusto-conical baffle portion 80) is about 78% of the horizontal diameter of the surface 74 at the plane of the surface 84, and the annular gap 82 is at least sufficiently wide so as to avoid the possibility of obstruction by solid particles in the slurry. The included conical angle of the baffle is about 103°. The axial distance (d') from the rim 22a to the surface 84 is about 12 mm and the ratio (D:d') therefore about 6.25:1.

The distributor assembly 17a also comprises a stationary swirl member 86 located axially symmetrically with the duct portion 17, an annular passage being defined between the swirl member 86 and the duct portion 17. The swirl member 86 comprises an axially symmetrical upright sharply pointed conical upper end portion 88 and a cylindrical lower end portion 90 from which extend outwardly four symmetrically arranged swirl blades 92 (only three of which are shown). The included conical angle of the upper end portion 88 is about 80°. The baffle portion 80 is secured to the cylindrical portion 90 by a screw 94, and the swirl member 86 is secured within the duct 17 by locking pins 96 which engage the swirl blades 92. Each swirl blade 92 (as viewed in FIG. 3) has a distorted L-configuration with the lower limb 93 of the L inclined generally at the same angle as the surface 74 of the cup 18.

The duct portion 17 comprises an upright frusto-conical upper portion 104 vertially coextensive with the conical portion 88 of the swirl member 86, and a lower cylindrical portion 106 which terminates in a frusto-conical end surface 102 collinear with the surface 74 of the cup 18 and terminating in a rim 103. The lower portion 90 of the swirl member 86 and the swirl blades 92 terminate in the plane of the rim 103.

In operation the slurry supplied via the interior of the stationary duct 56 and being directed onto the extended surface 74 by the distributor assembly 17a is given a swirling component of motion by the blades 92; and the slurry forms a thin continuous film on the surface 74 as previously described herein; the cup 18 rotates in the same sense as the swirling motion. Acceleration of the slurry does not take place until it reaches the surface 74, where it is caused by the rotation of the cup 18.

It will be noted that the annular gap 82 is unobstructed downstream of the blades 92 and this further minimises the risk of blockage of the flow of slurry due to solids build-up. It will be noted also that there are no slurry passages of significantly restricted cross section upstream of the gap 82.

It has been found that the atomiser 9 operates satisfactorily with flow rates of slurry e.g. from 1 to 10 Imperial gallons per minute and with slurry concentrations up to e.g. 40% lime solids by weight.

It is believed that the atomiser 9 provides for minimum liquid or slurry contact time and thin film formation on the extended surface of the cup, to reduce the tendency for build-up of solids either through chemical or mechanical action.

Figure 3A:
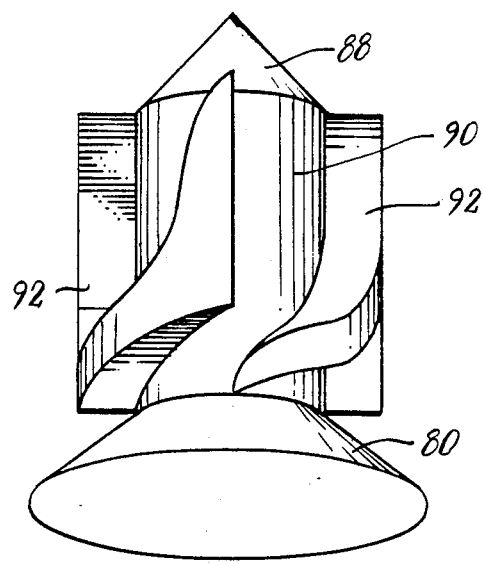
FIG. 3A shows a perspective view of a part also shown in FIG. 2.
Figure 3:
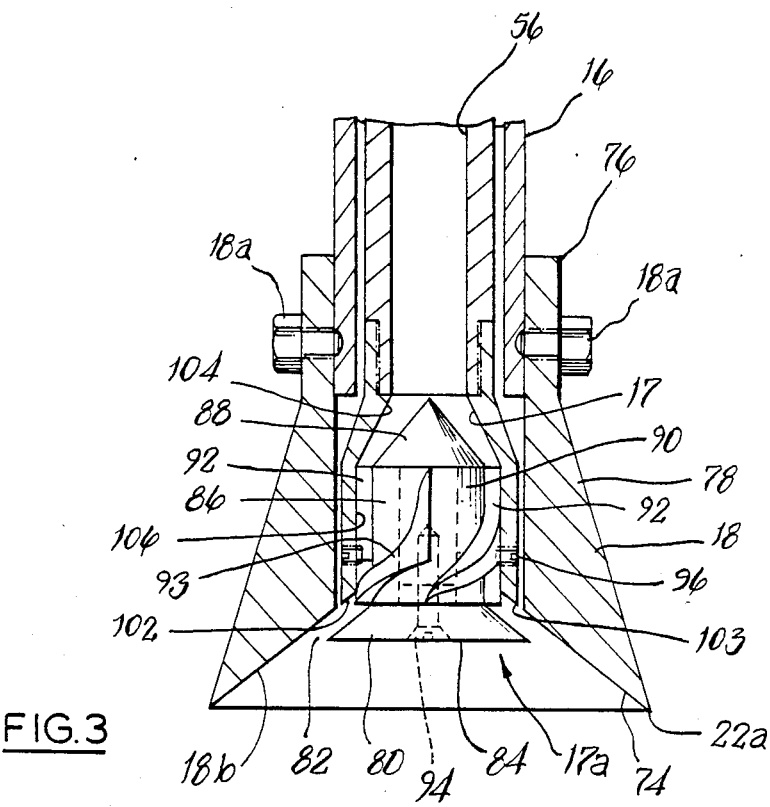
FIG. 3 shows an enlarged view of parts also shown in FIG. 2.
Figure 4:
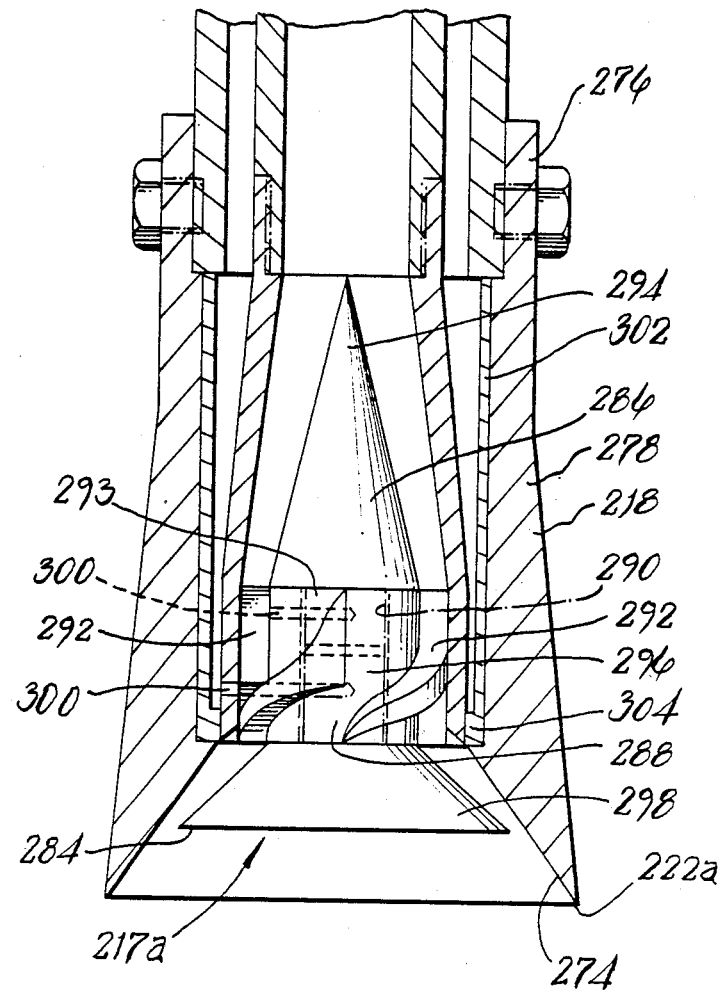
FIG. 4 shows a part-sectional view of a modified rotary cup and distributor assembly.

The modified cup and distributor assembly shown in FIG. 4 resembles that shown in FIG. 3 in many respects of construction and arrangement, and is described insofar as it differs therefrom.

The distributor assembly 217a of FIG. 4 is generally longer and more streamlined than the distributor assembly 17a. The assembly 217a comprises a swirl assembly 286 which comprises a cylindrical central portion 288 from which extend four swirl blades 292. The central portion 288 comprises an axial bore 290 into which are screwed a stub 293 of a conical upper end portion 294, and a stub 296 of a lower frusto-conical baffle portion 298; the stubs 292, 296 are secured in the bore 290 by locking pins 300.

A cylindrical plastics bush 302 is secured within the cup 218 and a lower annular inwardly projecting portion 304 thereof provides a bearing surface closely adjacent the distributor assembly 217a.

The included frusto-conical angle β (FIG. 5) of the surface 274 of the cup 218 of FIG. 4 is about 94°; the overall height of the cup 218 from the rim 222a to the top of the cylindrical portion 276 is about 125 mm; the diameter (D) of the cup 218 at the rim 222a is about 75 mm. The ratio of the axial height of the frusto-conical portion 278 of the cup 218 to the cylindrical portion 276 is about 1.5:1.

The axial distance (d) from the rim 222a to the upper extremity of the surface 274 is about 20 mm and the ration D:d therefore about 3.75:1. The diameter of the surface 284 is about 81% of the horizontal diameter of the surface 274 at the plane of the surface 284. The included conical angle of the baffle 298 is about 102° or 108°. The included conical angle of the upper end portion 294 is about 24° or 28°. The axial distance (d') from the rim 222a to the surface 284 is about 10 mm and the ratio (D:d') therefore about 7.5:1.

Attention is directed also to U.K. Patent Application Nos. 2,131,328A and 83 30 662 both of Dresser Industries, Inc.

I claim:

1. A spray device comprising:
   (a) a massive axially symmetrical spray cup having an outer rim and an interior surface;
   (b) means for rotating the cup;
   (c) stationary distribution means, arranged symmetrically with respect to the cup, for directing liquid onto the interior surface of the cup and for providing a film of liquid on the interior surface preparatory to directing the liquid from the surface past the outer rim; and
   (d) means for supplying a gas stream to impact the liquid immediately beyond the rim to produce a spray of liquid droplets; the distribution means comprising:
   (e) a downstream duct portion; and
   (f) stationary swirl means for providing a swirl component of motion in the liquid being directed onto the extended surface; the swirl means comprising:
   (g) a stationary swirl member axially symmetrically located within the downstream duct portion of the distribution means, and wherein an annular passage is defined between the swirl member and the duct portion, and said member comprising:
   (h) a plurality of symmetrically arranged swirl blades; and
   (i) an axially symmetrical upstream conical portion with the apex of the cone leading with respect to the liquid flow.

2. A spray device comprising:
   (a) an axially symmetrical rotary spray cup having an outer rim and an interior surface;
   (b) distribution means, arranged symmetrically with respect to the cup, for directing liquid onto the interior surface of the cup and for providing a film of liquid on the interior surface preparatory to directing the liquid from the surface past the outer rim, which distribution means is stationary where it directs the liquid onto the interior surface; and
   (c) means for supplying a gas stream to impact the liquid immediately beyond the rim to produce a spray of liquid droplets; the distribution means comprising:
   (d) a downstream duct portion; and
   (e) stationary swirl means for providing a swirl component of motion in the liquid being directed onto the extended surface; the swirl means comprising:
   (f) a stationary swirl member axially symmetrically located within the downstream duct portion of the distribution means, and wherein an annular passage is defined between the swirl member and the duct portion; the said member comprising:
   (g) an axially symmetrical upstream conical portion with the apex of the cone leading with respect to the liquid flow.

3. A device according to claim 2, comprising means for rotating the cup about its axis.

4. A device according to claim 2, comprising means for rotating the cup about its axis in the same sense as the swirl component of motion.

5. A device according to claim 2, 3 or 4, wherein the swirl member comprises an axially symmetrical downstream portion extending into the cup coaxially therewith and which provides a downstream facing baffle to gas flow, an unobstructed annular gap being defined between the baffle and the interior of the cup.

6. A device according to claim 5, wherein the baffle portion is frusto-conical, diverging in the downstream direction.

7. A device according to claim 2, 3 or 4, wherein the included conical angle of the upstream conical portion is from 20° to 85°.

8. A device according to claim 7, wherein said angle is from 20° to 40°.

9. A device according to claim 2, 3 or 4, wherein the distribution means comprises a corresponding frusto-conical duct portion within which the conical portion of the swirl member is located.

10. A device according to claim 2, 3 or 4, wherein the cup is of a massive form.

11. A device according to claim 2, 3 or 4, wherein said outer rim is sharply pointed.

12. A device according to claim 2, 3 or 4, wherein the interior surface of the cup converges generally frusto-conically upstream from the outer rim of the cup.

13. A device according to claim 6, wherein the interior surface of the cup converges generally frusto-conically upstream from the outer rim of the cup.

14. A device according to claim 2, 3 or 4, wherein the cup in external profile comprises an externally circular cylindrical upstream portion and an externally frusto-conical downstream portion which converges upstream from the outer rim of the cup.

15. A device according to claim 14, wherein the ratio between the axial height of the frusto-conical portion and the height of the cylindrical portion is from 3:1 to 1:3.

16. A device according to claim 15, wherein said ratio is from 2:1 to 1:3.

17. A device according to claim 2, 3 or 4, wherein the swirl member comprises a plurality of symmetrically arranged swirl blades.

18. A device according to claim 17, wherein each swirl blade when viewed in a direction perpendicular to the axis of the swirl member has a distorted L-configuration.

19. A device according to claim 18, wherein a downstream limb of the L is inclined generally at the same angle as an adjacent portion of the interior surface of the cup.

20. A method of spraying a slurry comprising the step of directing the slurry from the interior surface of a device according to any one of claims 1, 2, 3 or 4.

21. A method of treating a polluted gas with a liquid comprising the step of directing the liquid from the interior surface of a device according to any one of claims 1, 2, 3 or 4.

22. A method of treating a polluted gas with an aqueous slurry comprising the step of directing the slurry from the interior surface of a device according to any one of claims 1, 2, 3 or 4.

23. A method according to claim 20, comprising the step of rotating the cup about its axis in the same sense as the swirl component of motion.

24. A method according to claim 20, comprising the step of rotating the cup at a speed up to 6000 revolutions per minute.

25. A method according to claim 21, wherein the liquid is capable of chemical reaction with a gaseous pollutant in the gas; and comprising the step of absorbing the pollutant from the gas by the liquid with said chemical reaction.

26. A method according to claim 21, wherein the gas contains sulphur dioxide as a pollutant, the liquid is capable of reacting with sulphur dioxide, and comprising the step of absorbing the pollutant from the gas by the liquid with said chemical reaction.

27. A method according to claim 25, wherein the liquid is aqueous; and comprising the step of drying the reaction product as it is formed and evaporating the water.

28. A method according to claim 26, wherein the liquid is aqueous; and comprising the step of drying the reaction product as it is formed and evaporating the water.

29. A method according to claim 26, wherein the liquid is an aqueous slurry of lime, and comprising the step of drying the reaction product as it is formed and evaporating the water.

30. Apparatus adapted for use in absorbing a gaseous pollutant from a pollutant-containing gas under spray drying conditions comprising:
 (a) a spray dryer vessel;
 (b) means for conducting a pollutant-containing gas to the vessel;
 (c) a spray device according to any one of claims 32, 33, 34 or 35, adapted to spray an aqueous absorbent liquid into the vessel for reaction with the pollutant in the gas under the spray drying conditions to produce a solid reaction product;
 (d) means for separating solid reaction product from the gas; and
 (e) means for conducting the gas from the spray dryer vessel to the separating means.

* * * * *